June 2, 1931. H. A. DENMIRE 1,808,711
VULCANIZING APPARATUS
Original Filed Nov. 9, 1927   3 Sheets-Sheet 1

INVENTOR
Harold A. Denmire
BY Evans & McCoy
ATTORNEYS

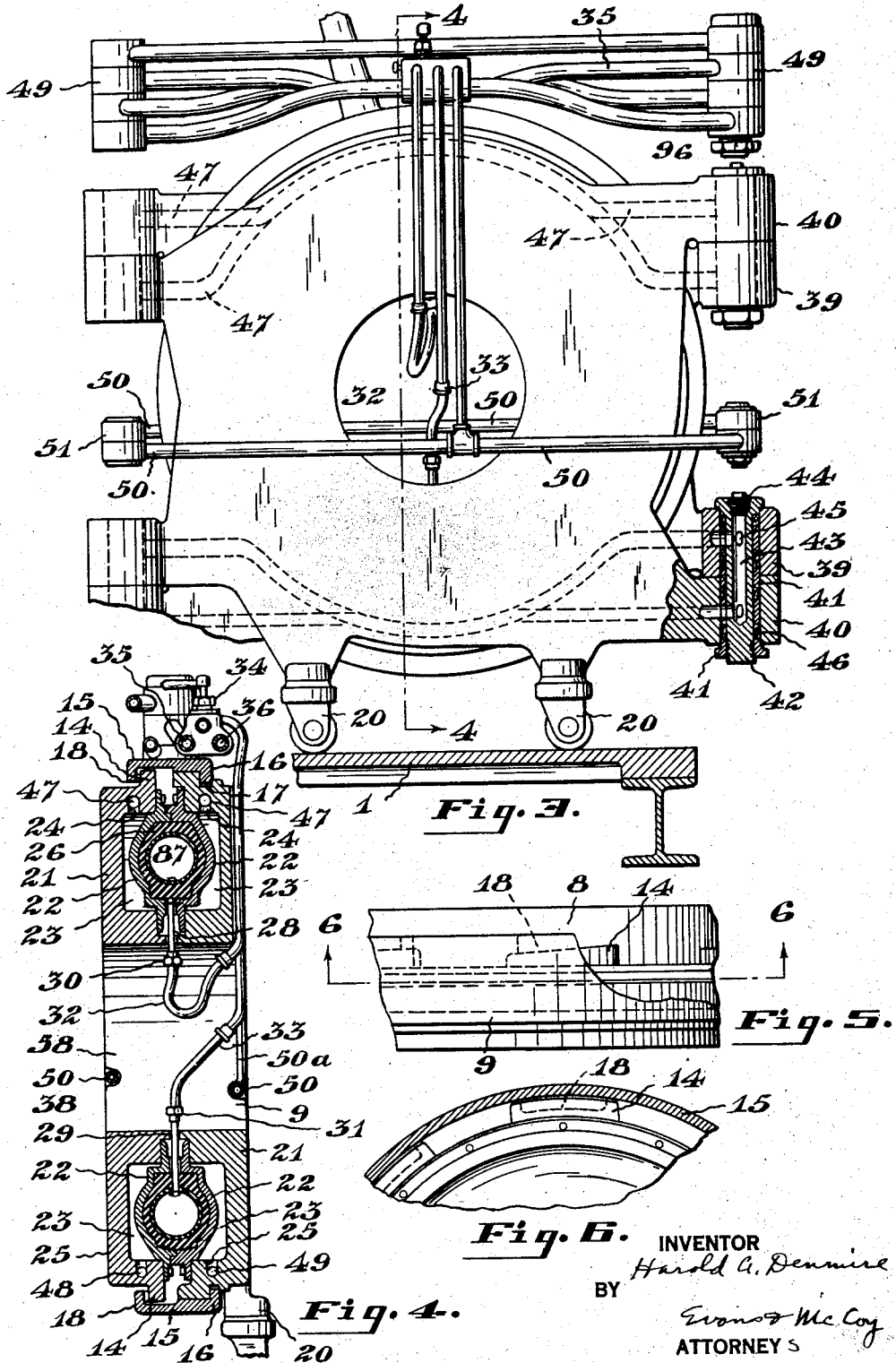

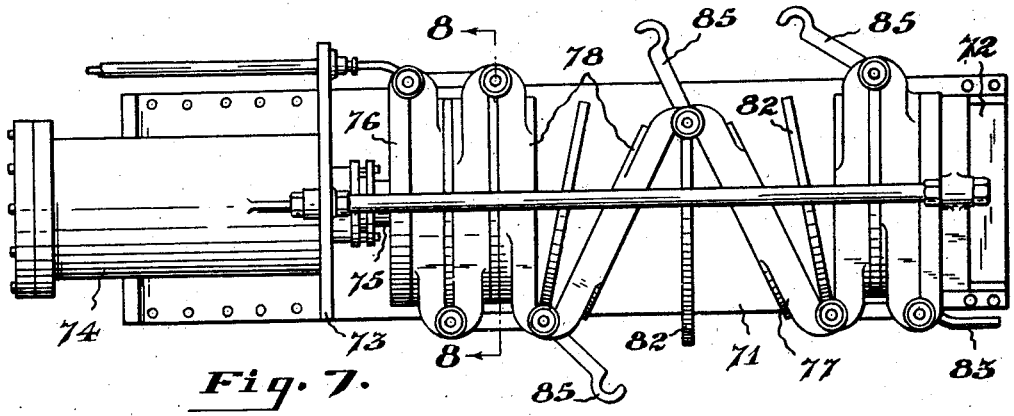
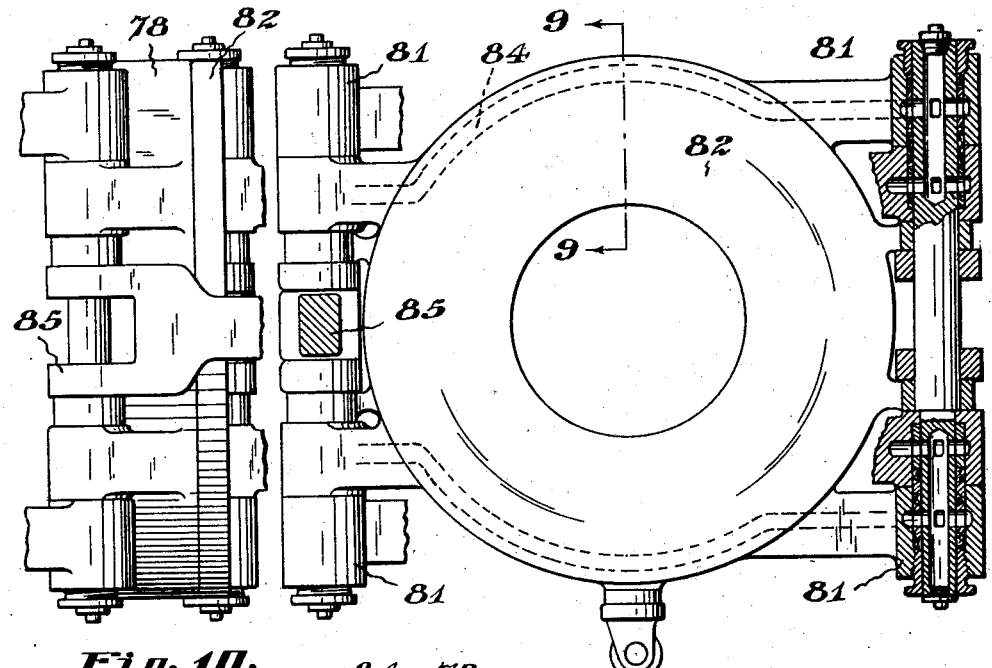
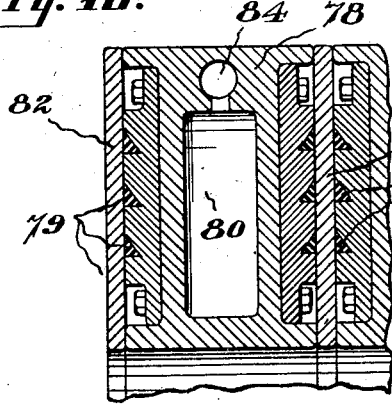

Patented June 2, 1931

1,808,711

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

VULCANIZING APPARATUS

Original application filed November 9, 1927, Serial No. 233,597. Divided and this application filed January 20, 1930. Serial No. 422,074.

This invention relates to vulcanizing apparatus of the type in which the articles to be vulcanized are confined in a plurality of molds arranged in a pack and more particularly to the mounting of the molds for selective opening and closing, so that the molds can be quickly and easily discharged and recharged, the present invention being a division of my copending application Serial No. 233,597, filed Nov. 9, 1927.

Although the invention is of quite general application, it is of particular utility in connection with the vulcanizing of pneumatic tire casings, inner tubes, tire beads and the like. However, it will be obvious that the invention may be used for other purposes.

The present invention has for an object to provide a heater unit which may be operated economically, independently of other units and further to provide a heater unit consisting of a plurality of molds which can be installed and operated at a relatively low cost, which requires a small amount of floor space.

A further object is to provide a vulcanizing heater consisting of a plurality of molds composed of hinged sections adapted to fold into a pack and provided with suitable actuating means by which the individual molds may be opened at a point convenient to an operator or operators standing alongside the heater unit, so that the operators are enabled to quickly remove vulcanized articles from the molds and replace the same with unvulcanized articles.

A further object is to provide a vulcanizing heater consisting of separately heated mold units composed of sections hinged to each other and to sections of adjacent mold units and to provide actuating means for selectively opening the mold units so that one mold unit may be discharged and recharged while articles are being vulcanized in other mold units.

A further object is to provide means for applying pressure to the molds, together with independent locking means for each mold, so that any selected mold may be unlocked and opened independently of the others.

With the above and other objects in view, the invention may be said to comprise the vulcanizing heater as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 3 is a side elevation of a mold unit with one of the hinge connections shown in section.

Fig. 4 is a section taken on the line indicated at 4—4 in Fig. 3.

Fig. 5 is a detail view showing the locking ring carried on one section of a mold unit and the wedge locking lugs on the other mold section.

Fig. 6 is a section taken on the line indicated at 6—6 in Fig. 5.

Fig. 7 is a plan view of apparatus embodying the invention designed for vulcanizing bead rings.

Fig. 8 is a side elevation of one of the molds shown in Fig. 7.

Fig. 9 is a section taken on the line indicated at 9—9 in Fig. 8.

Fig. 10 is an end elevation of the mold shown in Fig. 8.

Figures 1, 2:
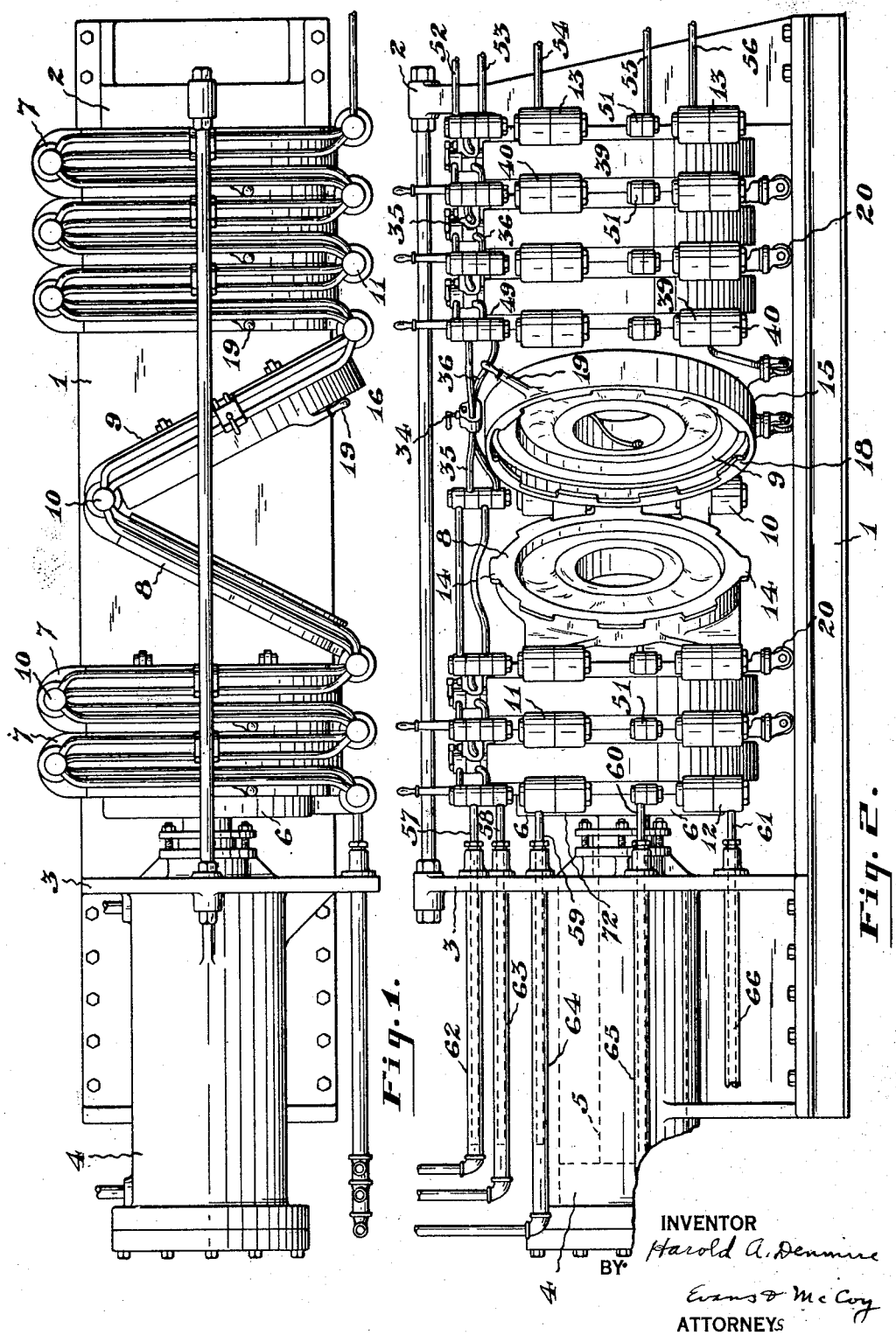
Figure 1 is a plan view of apparatus embodying the invention.
Fig. 2 is a side elevation of the apparatus shown in Fig. 1.

Referring first to Figs. 1 to 6, in which the invention is shown applied to molds of the watch case heater type, the apparatus is supported on a frame consisting of a horizontal supporting base or platform 1 having fixed standards 2 and 3 at opposite ends thereof. Mounted on the standard 3, there is a horizontally disposed fluid pressure cylinder 4 from which projects a piston rod 5 carrying a head 6 which is movable toward and away from the standard 2. A series of molds 7 are mounted between the head 6 and the standard 2 and each of these molds consists of complemental sections 8 and 9 which are connected by hinges 10. The adjacent molds are connected by hinges 11 diametrically opposite the hinges 10 so that a mold may be opened upon movement of the head 6 with respect to the standard 2. The mold at one end of the pack supported on the platform 1 between the head 6 and the standard 2 is connected by a hinge 12 to the head 6 and the mold at the opposite end of the pack is connected by a hinge 13 to the standard 2.

The section 8 of each mold has wedge lugs 14 projecting laterally therefrom at spaced points along the periphery and the section 9 of each mold carries a locking ring 15 which has an inner flange 16 which fits in a peripheral groove on the mold section 9. The ring 15 surrounds the mold section 9 and projects inwardly past the inner face of the section and has inwardly projecting wedge lugs 18, which are adapted, in one position of the ring, to enter between the lugs 14 of the section 18 and, when the ring 15 is rotated on the mold section 9, to come into wedging engagement with the lugs 14, to tightly clamp the mold sections together, the ring 15 being provided with a handle 19 by which it may be turned into locking engagement with the lugs 14 or into a position to release one mold section from the other. The head 6 is movable from the position shown in Fig. 1 to a position in which the mold pack is clamped between the head 6 and the standard 2. The molds are provided with caster wheels 20 so that they are readily movable along the platform 1 and if one of the molds has its ring 15 moved to a position where the lugs 18 of the ring are disengaged from the lugs 14 of the section 68 of the mold, this mold will be broken open when the head 6 is drawn toward the cylinder 4 so that an operator alongside the platform may remove a cured tire from the mold and insert an unvulcanized tire in the mold. Operation of the hydraulic cylinder may be suitably interlocked with the clamping rings 15 by suitable electrical contact elements to prevent operation of the piston except when one of the locking rings is released.

As best shown in Fig. 3 of the drawings, each mold section has an annular channel shaped body portion 21, the channels of the sections of a mold facing toward each other. Secured upon the inner sides of each of the sections and extending across the channel, there is a concave metal plate 22 forming one half of the tire receiving recess and also forming the inner wall of an annular steam jacket 23. When the two mold sections are secured together, the plates 22 of the mold sections are clamped together and form between them the annular recesses in which the tire is held during the vulcanizing process. Each of the steam jackets 23 has a steam inlet port 24 adjacent the top of the mold and a drain port 25 adjacent the bottom of the mold. A tire casing 26 within the mold is preferably provided upon the interior thereof with an air bag 27 which has a single valve stem if air is used as an inflating medium or, in the preferred form, has valve stems 28 and 29 projecting through the wall of the mold into the center opening thereof for circulating hot water through the air bag under vulcanizing pressure. The valve stems 28 and 29 are adapted to receive coupling members 30 and 31 carried by flexible tubes 32 and 33, which lead through suitable control valves 94 to inlet and drain pipes 95 and 96.

During the vulcanizing process, hot water or other fluid under inflating pressure is supplied to the air bags through the hose 33, and drained therefrom by hose 32. Prior to the removal of the vulcanized casing from the mold, the supply of hot water is interrupted and cooling water is circulated through the air bag through the flexible tubes 32 and 33, to chill the vulcanized tire casing before it is removed from the mold. The control valve 34 is then turned to admit air under pressure from pipes 50 and 50a to tube 32. This removes water from the air bag. The inflating pressure in the air bag is then released by turning valve 34.

Each of the hinges of the mold sections consists of two pairs of lugs 39 and 40 integral with the connected mold sections, each pair being joined by a pintle composed of an outer packing sleeve 41 and a pin 42 within the sleeve, the upper and lower pintles of the hinge being in axial alinement. Each pin 42 has a bore 43 extending from one end, the open end of the bore being closed by a plug 44 to provide a chamber within the pintle. Ports 45 open laterally from the bore 43 of the pin into passages in the lugs 39 and 40. Cored passages 47 in the upper portion of each mold section lead from the ports 45 and 46 of the upper pintle of each hinge and these passages communicate with the steam inlet ports 24 of the steam jackets. Cored passages 48 formed in the lower portion of each mold section communicate with the ports 45 and 46 of the lower pintles and these passages communicate with the drain ports 25 of the steam jackets. The pipes 35 and 36 carried by each mold section are joined to the corresponding pipes of adjacent mold sections through the hinge couplings 49, which are positioned in axial alinement with the pintles of the hinges connecting the sections. Each mold section carries a transversely extending pipe 50 and lead pipes 50a through which air is supplied to the valve 34 and by it to the short lengths of hose 32 through which the air is supplied to the air bag. The air pipes 50 of adjacent sections are connected by hinge couplings 51 which are also in axial alinement with the hinges connecting the mold sections. A hot water inlet pipe 52 and a water outlet pipe 53 are connected to the hinge coupling 49 which is alined with the hinge connecting the endmost mold section to the standard 2. A steam outlet pipe 54 is connected to the upper lug 40 integral with the standard 2 and forming a part of the hinge connection between the endmost mold section and the standard 2. An air inlet 55 is connected through the endmost hinge 51 with the air pipes on the mold sections and a drain pipe 56 is connected to the lower lug 40 of the hinge connecting the endmost mold section to the standard 2. Means is preferably provided for admitting water, steam or air and for draining the water from either end of the pack of molds and connections corresponding to the connections with the pipes 52, 53, 54, 55, and 56 are made with water inlet and outlet pipes 57 and 58, a steam inlet pipe 59, an air inlet pipe 60 and a drain pipe 61 at the hinge between the end mold section and movable head 6. The pipes 57, 58, 59, 60 and 61 move with the head 6 and have telescopic connection with pipes 62, 63, 64, 65 and 66, which are secured to the standard 3 so that connection is maintained between the pipes 57, 58, 59, 60, 61 and the pipes 62 and 63, 64, 65 and 66, regardless of the position of the head 6.

In the operation of the vulcanizing apparatus, assuming that the molds are all empty and that it is desired to charge the same with uncured tires, the locking ring 15 of one of the end molds is moved to releasing position and the head 6 is drawn back toward the cylinder 5, breaking open this mold. An unvulcanized tire casing with an air bag therein is then placed in the section of the mold to which the air hose 7 is attached and the air hose is coupled to one of the valve stems of the air bag. The head 6 is then moved by means of the cylinder 4 toward the standard 2 to swing the mold to a closed position, whereupon the ring 15 is moved to a locking position. Steam is maintained in the steam jackets 23 of the molds. The locking ring 15 of the next adjacent mold is then moved to releasing position and the head 6 again moved to open the second mold which is charged and closed in the same manner as the first mold. This operation is repeated until the desired number of molds have been charged. After sufficient time has elapsed for the vulcanization of the tire casing in the first mold, the water lines 32 and 33 are connected to the valve stems 28 and 29 of the air bag and the valve 34 is turned to circulate cooling water through the air bag. As soon as the casing is sufficiently cool, the water supply is cut off, air is admitted to drive the cooling water out of the air bag and out of discharge port 37. Pressure on the air bag is then released, the ring 15 of the mold is moved to releasing position and the mold is broken open by shifting the movable head 6. The cured tire is then removed from the mold and replaced with an uncured tire. The mold will then be again closed and locked in closed position and the second mold opened, this procedure being repeated until all of the molds have been emptied and recharged.

Figs. 7 to 10 of the drawings show the invention applied to apparatus for vulcanizing bead rings for pneumatic tire casings and in this modification, the molds are supported upon a frame having a horizontal base or platform 71 and fixed standards 72 and 73 at opposite ends of the platform. The standard 73 carries a fluid pressure cylinder 74 from which extends a piston rod 75 provided in a manner similar to the molds in the modification shown in Figs. 1 to 6, the molds, however, are constructed to receive bead rings instead of tire casings.

Each mold consists of an annular mold frame 78 having annular mold plates 78—a removably secured thereto. Each mold plate has ring receiving channels 79 in the side face thereof. The annular mold frames are each hollow to provide an annular steam chamber 80. The molds 77 are connected by hinges 81, successive hinges being diametrically opposite each other and each hinge preferably carries a division plate 82 which closes the ring receiving channels of the molds on opposite sides thereof. Steam is admitted to the steam chambers 80 through an inlet pipe 83 and steam is carried from the chamber of one mold to the chamber of the next adjacent mold through cored passages 84 communicating through the hinges of the molds, as in the modification above described.

If a large group of molds are employed, suitable mold locks 85 may be used in lieu of the locking rings 15 shown and described in connection with Fig. 1 and Fig. 2 of the drawings. The locks 85 releasably connect each mold with the adjacent molds. The locks 85 may either be positioned on one side only of the mold group or they may be mounted on each side as shown. The locks are released for the molds that are to be opened and the molds are opened and closed by the moving piston head 76 substantially as in the modification shown in Fig. 1 to Fig. 6. If, however, the entire group of molds are intended to be simultaneously opened, then the locks 85 may be dispensed with.

The heater previously described is operated in substantially the same manner as the heater shown in Fig. 1 of the drawings except that an operator is stationed on each side of the unit for removing vulcanized heads and replacing them with unvulcanized heads.

The utility of the mold heaters herein described will be apparent to those skilled in the art. The heaters are inexpensive to construct, they can be operated by a minimum number of attendants with greatly increased production rate and are otherwise superior to heaters heretofore proposed.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A vulcanizing heater comprising a plurality of mold units consisting of mold members hingedly connected to one another and to mold members of adjacent units to fold into a pack, means for separately heating each mold unit, relatively movable members connected to the endmost mold members, and means operable to separate said movable members to open said molds, and operable in a reverse direction for closing said molds and for applying molding pressure to the pack of molds.

2. A vulcanizing heater comprising a horizontal support, a series of mold sections forming a plurality of mold units movably mounted on said support, successive mold sections being connected by vertically disposed hinges, relatively movable members on said support connected to the endmost mold members, and means operable to separate said movable members to open said molds and operable in a reverse direction to close said molds and apply molding pressure thereto.

3. A vulcanizing heater comprising a plurality of mold units consisting of mold members hingedly connected to one another and to mold members of adjacent units to fold into a pack, a steam chamber in a mold member of each unit, and means for supplying steam to said chambers.

4. A vulcanizing heater comprising a plurality of mold units consisting of mold members hingedly connected to one another and to mold members of adjacent units to fold into a pack, the mold members of each unit having complemental annular recesses forming mold chambers, steam chambers for supplying heat to the mold chambers, and means for supplying steam to said chambers including steam passages in the mold members communicating with the steam chambers and connected through the hinges connecting said members.

5. A vulcanizing heater comprising a plurality of mold units each having two opposed sections provided with recesses forming mold chambers, hinges connecting the mold sections to fold into a pack, the hinges connecting the sections of the mold units and the hinges connecting sections of adjacent mold units being on opposite sides of the mold sections, steam chambers in the mold sections, and means including steam passages through the hinges for supplying steam to said steam chambers.

6. A vulcanizing heater comprising a plurality of mold units each having two opposed sections provided with recesses forming mold chambers, hinges connecting the mold sections to fold into a pack, the hinges connecting the sections of the mold units and the hinges connecting sections of adjacent mold units being on opposite sides of the mold sections, steam chambers in the mold sections, means including steam passages through the hinges for supplying steam to said steam chambers, and means for supplying fluid under pressure to the mold chambers including pipes carried by mold sections and connected by hinge joints coaxial with said hinges.

7. A vulcanizing heater comprising a plurality of mold units each having two opposed sections provided with recesses forming mold chambers, hinges connecting the mold sections to fold into a pack, the hinges connecting the sections of the mold units and the hinges connecting the sections of adjacent mold units being on opposite sides of the mold sections, and separate means for locking the sections of each mold unit in closed position.

8. A vulcanizing heater comprising a plurality of mold units each having two opposed sections provided with recesses forming mold chambers, hinges connecting the mold sections to fold into a pack, the hinges connecting the sections of the mold units and the hinges connecting sections of adjacent mold units being on opposite sides of the mold sections, steam chambers in the mold sections, means including steam passages through the hinges for supplying steam to said steam chambers, and independently controlled means for supplying fluid under pressure to each mold chamber.

9. A vulcanizing heater comprising a plurality of mold units each having two opposed sections provided with recesses forming mold chambers, hinges connecting the mold sections to fold into a pack, the hinges connecting the sections of the mold units, and the hinges connecting sections of adjacent mold units being on opposite sides of the mold sections, and means for selectively opening and closing the molds.

10. A vulcanizing heater comprising a plurality of mold units each having two opposed sections provided with recesses forming mold chambers, hinges connecting the mold sections to fold into a pack, the hinges connecting the sections of the mold units and the hinges connecting sections of adjacent mold units being on opposite sides of the mold sections, a stationary member attached to one of the end mold sections, a fluid pressure actuating member attached to the other end mold section for moving the same toward and from the stationary member, and means for selectively locking the sections of the individual mold units in closed position.

11. A vulcanizing heater comprising a supporting platform, a fixed standard at one end of the platform, a head mounted at the opposite end of the platform for movement toward and away from the fixed standard, a mold section connected by a vertical hinge to said standard, a mold section connected by a vertical hinge to said head, intermediate mold sections pivoted to the first mentioned mold sections and to each other by vertical hinges, said sections having recesses forming mold chambers, successive hinge connections being on opposite sides of said intermediate sections whereby said sections may be folded into a pack, and means for actuating said head to open and close the mold chambers.

12. A vulcanizing heater comprising a supporting platform, a fixed standard at one end of the platform, a head mounted at the opposite end of the platform for movement toward and away from the fixed standard, a mold section connected by a vertical hinge to said standard, a mold section connected by a vertical hinge to said head, intermediate mold sections pivoted to the first mentioned mold sections and to each other by vertical hinges, said sections having recesses forming mold chambers, successive hinge connections being on opposite sides of said intermediate sections whereby said sections may be folded into a pack, means for actuating said head to open and close the mold chambers, and means for selectively locking adjacent mold sections against separation.

13. A vulcanizing heater comprising a supporting platform, a fixed standard at one end of the platform, a head mounted at the opposite end of the platform for movement toward and away from the fixed standard, a mold section connected by a vertical hinge to said standard, a mold section connected by a vertical hinge to said head, intermediate mold sections pivoted to the first mentioned mold sections and to each other by vertical hinges, said sections having recesses forming mold chambers, successive hinge connections being on opposite sides of said intermediate sections whereby said sections may be folded into a pack, and castor wheels supporting each mold section for movement on said platform.

14. A vulcanizing heater comprising a supporting platform, a fixed standard at one end of the platform, a head mounted at the opposite end of the platform for movement toward and away from the fixed standard, a mold section connected by a vertical hinge to said standard, a mold section connected by a vertical hinge to said head, intermediate mold sections pivoted to the first mentioned mold sections and to each other by vertical hinges, said sections having recesses forming mold chambers, successive hinge connections being on opposite sides of said intermediate sections whereby said sections may be folded into a pack, and a fluid pressure actuated member connected to said head for moving the same away from and toward the standard to open and close the mold and to apply pressure thereto.

15. A vulcanizing heater comprising a supporting platform, a fixed standard at one end of the platform, a head mounted at the opposite end of the platform for movement toward and away from the fixed standard, a mold section connected by a vertical hinge to said standard, a mold section connected by a vertical hinge to said head, intermediate mold sections pivoted to the first mentioned mold sections and to each other by vertical hinges, said sections having recesses forming mold chambers, successive hinge connections being on opposite sides of said intermediate sections whereby said sections may be folded into a pack, means for separately heating the mold sections, means for selectively locking adjacent mold sections against separation, and means for selectively supplying fluid under pressure to the mold chambers.

16. A vulcanizing heater comprising a stationary member, a member mounted for movement toward and away from the stationary member, and a pack of tire molds interposed between said members, said pack consisting of hingedly connected mold sections, the endmost sections of the pack being connected to the stationary and movable members, each mold consisting of two hinged sections having complemental annular recesses forming a mold chamber adapted to receive a pneumatic tire casing, independently operable means for locking each mold in closed position, means for separately heating the molds, and means for selectively supplying fluid under pressure to the interior of tire casings in the molds.

In testimony whereof I affix my signature.

HAROLD A. DENMIRE.